US010125680B2

(12) United States Patent
Bay

(10) Patent No.: US 10,125,680 B2
(45) Date of Patent: Nov. 13, 2018

(54) APPARATUS TO OPTIMIZE COMPRESSION

(71) Applicant: Adam G Bay, Chesterland, OH (US)

(72) Inventor: Adam G Bay, Chesterland, OH (US)

( * ) Notice: Subject to any disclaimer, the term of this patent is extended or adjusted under 35 U.S.C. 154(b) by 0 days.

(21) Appl. No.: 15/489,114

(22) Filed: Apr. 17, 2017

(65) Prior Publication Data

US 2018/0106190 A1 Apr. 19, 2018

Related U.S. Application Data

(60) Provisional application No. 62/409,536, filed on Oct. 18, 2016.

(51) Int. Cl.
*F02B 75/04* (2006.01)
*F16C 7/06* (2006.01)

(52) U.S. Cl.
CPC .............. *F02B 75/045* (2013.01); *F16C 7/06* (2013.01)

(58) Field of Classification Search
CPC .................................. F02B 75/045; F16C 7/06
See application file for complete search history.

(56) References Cited

U.S. PATENT DOCUMENTS 5,791,302 A * 8/1998 Ma .............................. 123/48 B
2012/0292906 A1* 11/2012 wilkins ........................... 290/50

* cited by examiner

*Primary Examiner* — Hung Q Nguyen

(57) ABSTRACT

An internal combustion engine with dual, independently configured connecting rods, for each piston, together maintaining higher compression at calculated crank angles during the expansion cycles. The independently expanding connecting rods being rotatably attached by the rod's first end and to two adjacent crank pin sections with one crank pin section having radially and axially variable axis. The two rod's second ends are pivotably attached to the lower two pins of the variably dimensioned three pin connecting element supporting the piston at the upper pivot pin, enabling the piston top to descend at a calculated, variable rate.

4 Claims, 14 Drawing Sheets

HATCH OF ITEM 12 NOT SHOWN
FOR CLARITY
DIMENSIONED FOR FIG. 13
COMPARISON TABLE

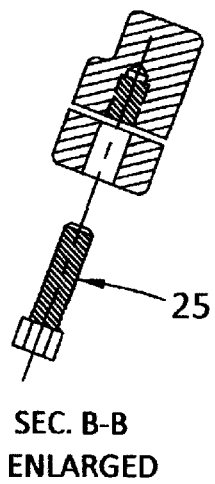
SEC. B-B
ENLARGED
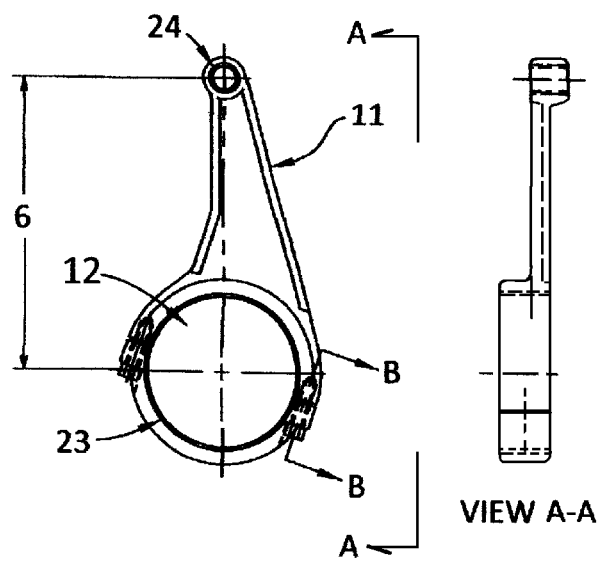
FIG. 3

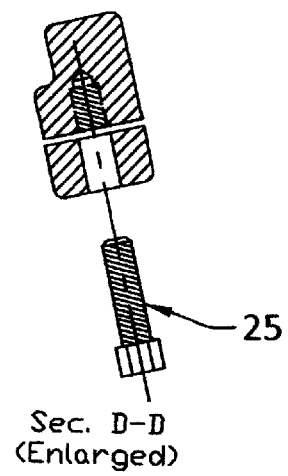
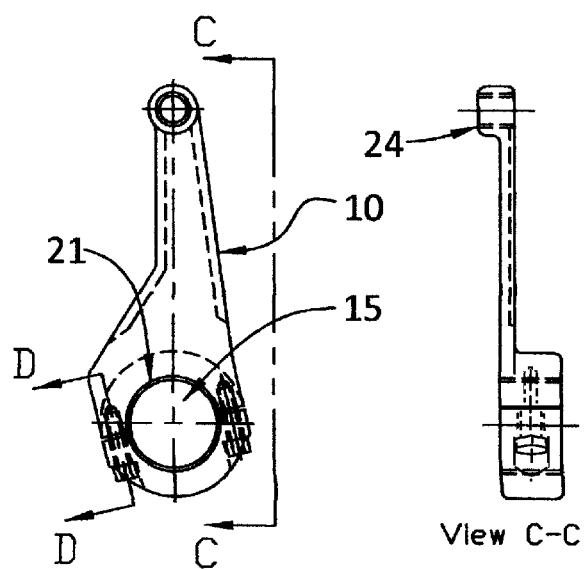
FIG. 4

SECTION E-E
OF FIG. 6

SECTION D-D
OF FIG. 6

TABLE 1

| PARAMETERS REQUIRED FOR COMPRESSION RATIO CALCULATIONS FOR ALL ENGINES DIMENSIONED FOR SAMPLE CALCULATIONS OF FIG. 13 | |
|---|---|
| CYLINDER BORE | 5" |
| PISTON STROKE | 4.5" |
| HEAD GASKET BORE | 5.06" |
| COMPRESSION HEAD GASKET THK | 0.021" |
| COMPRESSION V cc | 145 |
| PISTON DOME V cc | 0 |
| PISTON DECK CLEARANCE | 0.016" |

TABLE 2

| PARAMETERS REQUIRED TO CALCULATE STROKE FOR DUAL ROD ASSEMBLY / PRESENT INVENTION DIMENSIONED FOR SAMPLE CALCULATIONS OF FIG. 13 | | |
|---|---|---|
| ITEM | | |
| 19 | AXIAL CRANK PIN OFFSET | 0.75" |
| 20 | RADIAL CRANK PIN OFFSET | 255 DEGREES |
| 22 | CRANK SHAFT TO CRANK PIN CL. | 2.25" |
| 7 | LENGTH OF PISTON ROD #10 | 5.386" |
| 6 | LENGTH OF PISTON ROD #11 | 5.375" |
| 3 | UPPER ROD CONNECTOR #16 | 1.625" |
| 4 | UPPER ROD CONNECTOR #16 | 1.750" |
| 5 | UPPER ROD CONNECTOR #16 | 1.250" |

FIG. 11

TABLE 3

| COMPRESSION RATIO COMPARISON TABLE ||||||
| CONVENTIONAL ||| DUAL ROD || RESULT |
| CRANK ANGLE DEG. | STROKE INCHES | COMPR RATIO | STROKE INCHES | COMPR. RATIO | % HIGHER COMPRESSION |
| --- | --- | --- | --- | --- | --- |
| 0 | 4.5 | 10.218:1 | 4.5 | 10.218:1 | 0 |
| 22.5 | 4.1875 | 9.578:1 | 4.4587 | 10.154:1 | +6.10 |
| 45 | 3.5625 | 8.297:1 | 4.250 | 9.706:1 | +16.98 |
| 67.5 | 2.8125 | 6.761:1 | 3.562 | 8.297:1 | +24.27 |
| 90 | 1.875 | 4.840:1 | 2.812 | 6.761:1 | +39.69 |
| 112.5 | 1.125 | 3.304:1 | 1.875 | 4.584:1 | +38.74 |
| 135 | 0.50 | 2.024:1 | 0.500 | 3.048:1 | +50.54 |
| 157.5 | 0.125 | 1.256:1 | 0.125 | 1.896:1 | +50.95 |
| 180 |  |  |  | 0 |  |

ASSEMBLY 2 AS DIMENSIONED IN FIG. 11

COMPARISON OF COMPRESSION RATIOS AT CRANK ANGLES

OF THE EXPANSION CICLE

CONVENTIONAL= O, DUAL ROD= X, DUAL FUEL INJECTION= Y, Y/X

COMPRESSION

11,000: 1
10,000: 1
9,000: 1
8,000: 1
7,000: 1                           Y/X
6,000: 1                 O      X
5,000: 1
4,000: 1                        Y
3,000: 1
2,000: 1
1,000: 1

CRANK    0   22.5   45   67.5   90   112.5   135   157.5   180

ANGLE DEGREES

FIG. 14

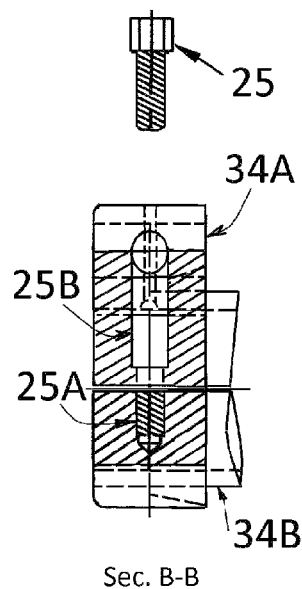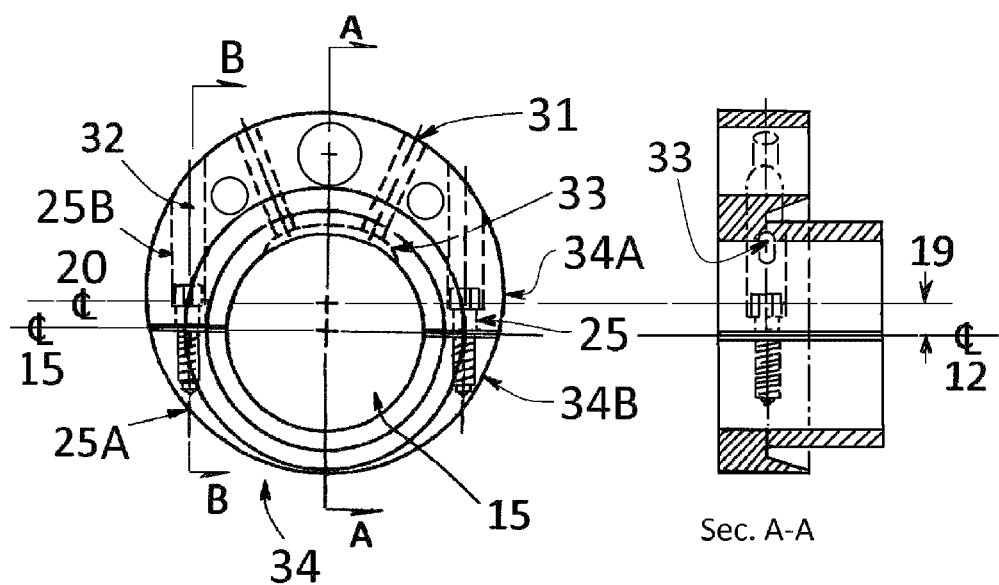
FIG. 15

APPARATUS TO OPTIMIZE COMPRESSION

FIELD OF THE INVENTION

The number of FIG.-s with redundant information reduced and rearranged, combined, with same information of the Provisional Appl. 62/409,536.

The present invention relates to a mechanical assembly for an internal combustion engine device of variable higher compression having advantageous crank angles at the expansion cycle of an internal combustion engine

BACKGROUND OF THE INVENTION

In general the compression ratio of an internal combustion engine is represented by the largest volume of the combustion chamber prior to compression and the smallest volume of the compression chamber after compression. The output of the internal combustion engine increases if the highest occurring compression is aligned with crank angles closest to 90 degrees to the piston rods.

Current improvements of combustion engines relate to an additional injection of fuel at half burn. However, this approach uses expensive technology, high computing and has no means of retarding piston descent at the same time. Other improvements in engine design are related to cam actions on the crank shaft and the "piston in piston"approach but not while selectively aligned with best crank angles. The present prevailing art prefers so called "square" engines, by having, larger diameter pistons, locating four valves, ignition and Direct Fuel Injector atop the piston area. The present invention finds advantageous application with these larger diameter pistons.

SUMMARY OF INVENTION

The present invention provides a mechanical assembly for use in an internal combustion engine that provides higher compression ratios, with simultaneous ability to slow down the expansion of the combustion chamber volume at the most advantageous crank angles, while the crank shaft rotates at the same rate. The radial variations between the two crank arm centerlines relative to the crank shaft and the variable pivot dimensions of the piston rod connector facilitates the slower descent of the piston top and retains higher compression to improve output. This is done with conventional "low" technology.

BRIEF DESCRIPTION OF THE DRAWINGS

FIG-s rearranged, reduced to simplify information from Prov. Application 62/409,536.

The present invention will now be described by way of example with reference to the accompanying drawings.

FIG. 3 is a frontal and side view of a piston {connecting} rod of the larger diameter and offset crank pin section with sections A-A, B-B and C-C, referenced also for the Compression Ratio Comparison Table.

FIG. 4 is a view of a piston rod of the conventional and smaller diameter crank pin section with section A-A and B-B, referenced also for the Compression Ratio Comparison Table.

FIG. 11 TABLE 1 of the Required Parameters for Compression Ratio Calculations in today's engines due to the variable and uneven features of a piston top and combustion chamber above the piston. For these reasons, compression is defined by stroke and volume in "cc" (cubic centimeters) above the piston, and not by a dimension between the piston top and the combustion chamber. Dimensions shown are based on the selected dimensions of cylinder bore and piston stroke for the Compression Ratio Comparison Table. TABLE 2 of the Required Parameters to Calculate Stroke for the Dual Rod Assembly of the present invention. ITEMS shown and referenced in previous FIGS are dimensioned for the Compression Ratio Comparison Table of FIG. 12.

FIG. 11 can further extend piston pin position while crank shaft rotates forward clock wise thus lowering conventional pin position at the next crank angle shown, resulting in a slightly lower piston pin position, as calculated. Further rotation of crank shaft changes geometry of upper rod connector, defining the slower descent of the piston in comparison of a conventional piston motion. The maximum extension of the dual rod assembly can be placed at the selected crank angle positions of the expansion cycle.

FIG. 14 demonstrates how the present day conventional engines O and assumed Y of the Dual Fuel Injection, compare with the proposed Dual Rod invention X. A possible combination of Dual Fuel Injection and Dual Rod compression is represented by the Y/X.

FIG. 15 plan view with sections A-A and B-B depicts an alternative embodiment of an attachable axially offset and radially variable larger and a conventional crank pin section, to provide bearing surface for an existing crank pin. FIG. 15 was formerly depicted and explained as FIG. 18 in Provisional Patent Application 62/409,536.

DETAILED DESCRIPTION OF THE PREFERRED EMBODIMENTS

Reference will now be made in detail to various embodiments of the present invention(s), examples of which are illustrated in the accompanying drawings and described below.

It will be understood that the present description not intended to limit the invention(s) to those exemplary embodiments of the present invention, but also various alternatives. Hereinafter, exemplary embodiments of the present invention will be described in details with reference to the accompanying drawings. Simplified depiction of elements of Assembly 2 as shown in FIGS. 1, 2, 3 and 4 of the Provisional Patent Application of 62/409,536 are slightly altered to be more realistic.

Figure 1:
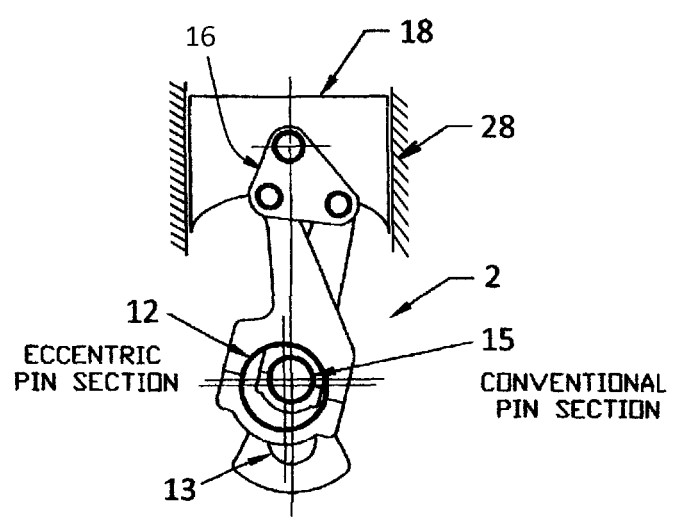
FIG. 1 is a schematic side elevation view as shown in FIG. 2 of a variable compression ratio device according to an embodiment of the present invention shown as part of a combustion engine, wherein a piston, to which is coupled to variable length capable connecting rods and a crank shaft.

Referring to FIG. 1 a schematic side elevation view of the dual rod assembly 2, a variable compression device is comprised of crank shaft 13 shown but for clarity, the crank pin area is only referred to as "Pin Sections" 12 and 15, a first connecting rod 10 and second connecting rod 11, and a connecting cam pivot 16, that connects the first and second connecting rods 10 and 11 to a piston designated 18 in the drawings, reciprocating in piston cavity 28.

Figure 2:
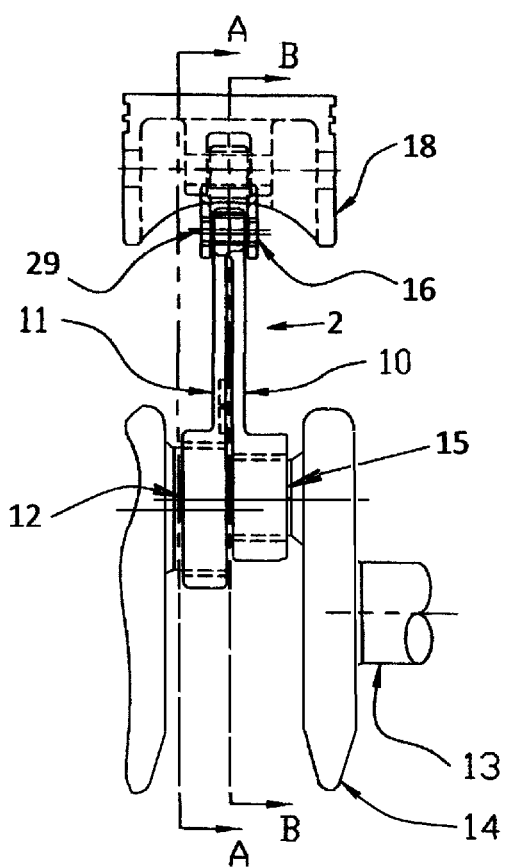
FIG. 2 is a side elevation view of the dual rod assembly in an extended position with the supporting dual fields the crank pin and crank arms of the crank shaft. The largest recommended axial offset and crank pin area is shown for easier visualization.

FIG. 2 a variable compression device depicted as assembly 2, in extended position, illustrating one embodiment of the present invention.

Figures 2A, 2B:
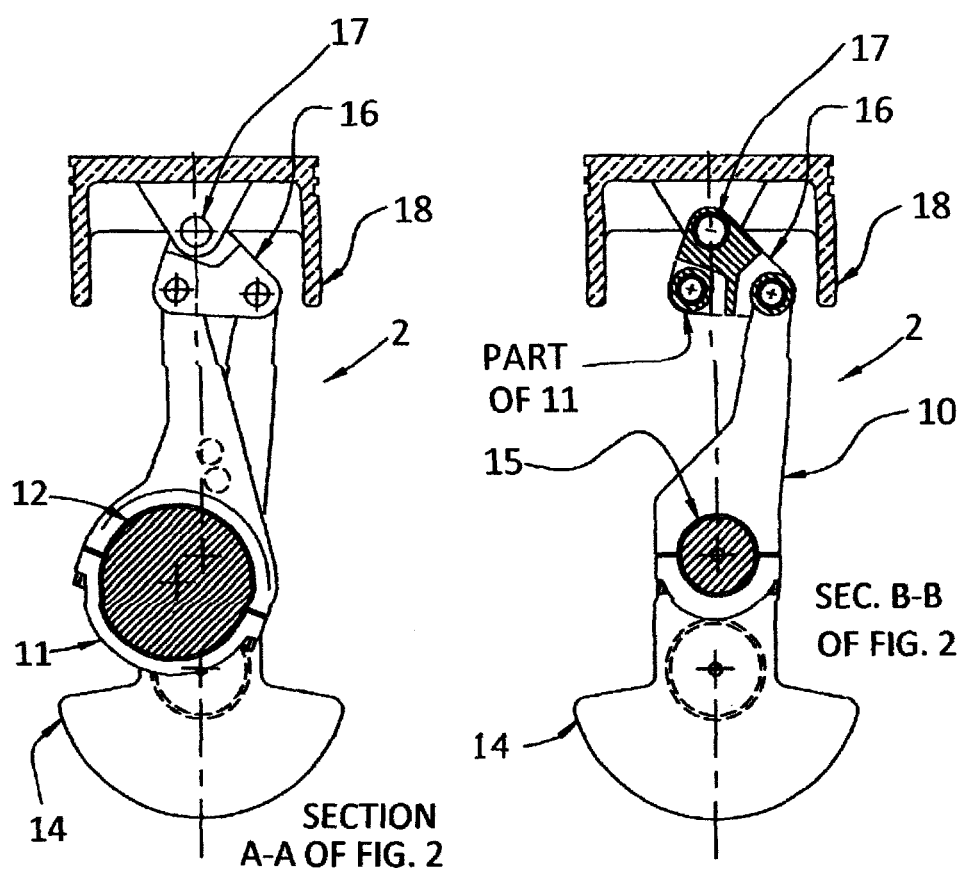
FIG. 2A is a cross sectional view taken along lines A-A of FIG. 2 showing the variable compression device in reference to the crank arms and crank pin, and showing a dual piston rod assembly and a piston connected to a rod and piston connector, with the supporting larger eccentric field of the crank pin.
FIG. 2B is a cross sectional view taken along lines B-B of FIG. 2 showing portion of dual piston rod assembly and a section the rod and piston connector, with the supporting smaller, conventional field of the crank pin.

Crank shaft 13 and crank arms 14, partially shown on one side, are coupled to crank pin sections 12 and 15. The connecting or (piston) rods 10 and 11 are attached to the crank pin sections 12 and 15, illustrated in sections A-A and B-B, while the other end of the connecting rods are connected to piston 18 through an upper connecting cam pivot 16 and piston pin 17, to move as one unit. When piston 18 reciprocates vertically, the connecting rod assembly that converts the reciprocating operation, to rotate the crank shaft 13, and crank shaft 13 generates a rotation power while rotating in one direction.

in FIG. 2A the assembly is depicted at section A-A of FIG. 2, sectioning the larger and offset crank pin section 12 with view of connecting rod 11 coupled to upper connecting cam pivot 16, attached to piston 18 by pin 17.

FIG. 2B section B-B of of FIG. 2, through pin area 15 supporting connecting rod 10, where the extruding upper bearing housing is sectioned, supporting upper connecting cam 16 and piston 18 attached by pin 17.

Figure 2C:
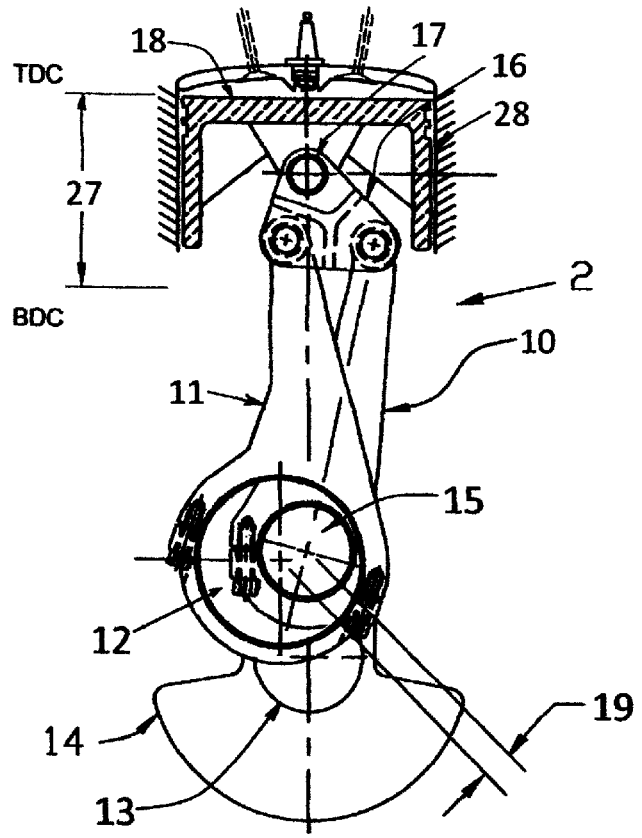
FIG. 2C provides references to a dual rod assembly in the compression chamber dome at TDC, piston deck clearance and combustion chamber outline to visualize the dual rod assembly at TDC with one particular selected axial and radial offset of the smaller and the larger crank pin area.

In FIG. 2C diagram, depicting components of assembly 2 wherein connecting or (piston) rods 10 and 11 are coupled to the crank pin section 12 and 15 while the other end of the connecting rods are connected to piston 18 through an upper connecting cam pivot 16 and piston pin 17, to move as one unit. When piston 18 reciprocates vertically in engine piston bore 28 from BDC to TDC, the connecting rod assembly that converts the reciprocating operation, to rotate crank shaft 13 and the crank shaft generates a rotation power while rotating.

FIG. 3 a frontal and Sec. B-B side elevational view of connecting rod 11 with crank pin bearing 23 and bearing 24 for the upper connecting cam pivot. View. B-B showing a side elevational view of the two part connecting rod 11 and pin bearing sections 23 defined by cylindrical bearing surface 12, mate along a plane through the axis of cylindrical opening 12 representing the larger pin section. the larger bearing sections are held together by screws 25 that extend through counter bored holes of one part into threaded holes of the other part. Connecting rod section A-A at the embedded position of one of the side bearing pads 26 facing connecting rod 10. Sec. C-C showing an enlarged cross sectional view of the two part larger bearing location and bolt 25. Upper bearing 24 distance to larger pin section bearing 23 referenced by 6 for the Compression Ratio Comparison Table 12.

FIG. 4 show the frontal configuration and View A-A showing a side elevation view of connecting rod 10 and depicting both upper and lower bearings 24 and 21, respectively. Connecting rod pin section bearings and bearing bores 21 held together by screws 25 that extend through counter bored holes of the other part into the threaded holes of the other part. Sec. B-B is taken along centerline of lower bearing, bolt.

Figure 5:
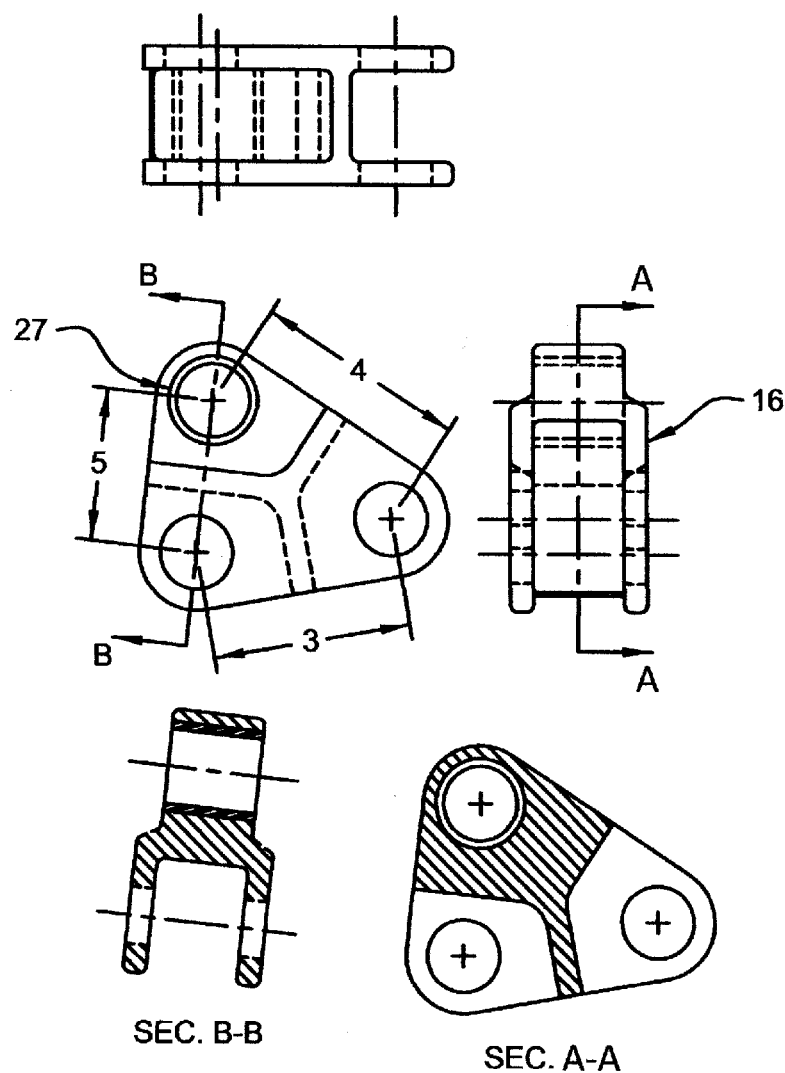
FIG. 5 is a frontal, side and top view depiction of the piston rod(s) upper connecting cam and piston pivot point with top view, and sections B-B and C-C, which three point geometry can define together, with the offset crank pin section axial and geometry the extension and retraction cycle relative to the expansion cycle and crank angle. Referenced for the Compression Ratio Comparison Table.

FIG. 5 shows the frontal, the top and end view configuration of rod connector pivot cam 16, with cross sectional side view A-A, sectional view B-B and piston connecting bearing 27.

Figure 6:
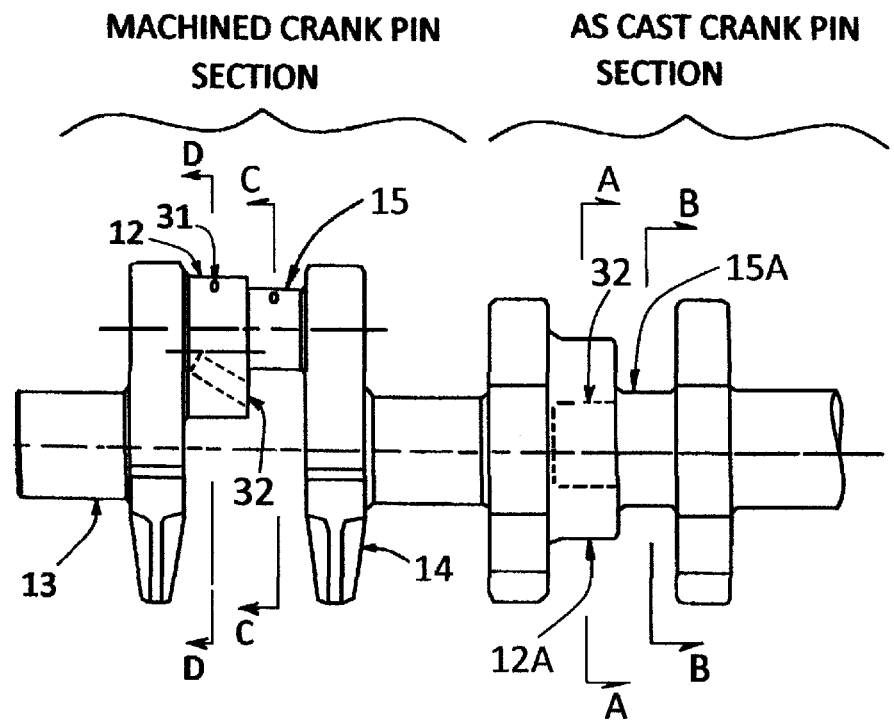
FIG. 6 depicts a partially machined crank shaft and the as cast crank pin wherein the larger diameter axially and radially offset and rotatable in 360 degrees cast section having a lightening opening next to the as cast smaller conventional pin section, with its cross sections A-A and B-B. The as machined crank pin showing the dual fields of crank pin sections with cross sections C-C and D-D.

FIG. 6 is a side view of a crank shaft 13 as cast, in sections A-A and B-B wherein cylindrical surface 12A an axially and radially offset area from the axis of the cylindrical surface 15A respectively, define the crank pin sections with lightening opening 32, and sections C-C and D-D of the as machined pin section 12 and 15 bearing surfaces, with oil dispensing openings 31, and lightening opening 32 referenced for the Compression Ratio Comparison Table 12.

Figure 7:
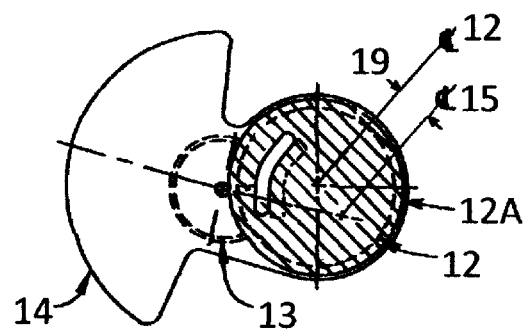
FIG. 7 is the as cast larger diameter pin area with a cast in lightening opening sectional view A-A of FIG. 6. When the offsets are previously determined and referenced for the Compression Ratio Comparison Table in FIG. 4.

FIG. 7 is a section view taken along lines of A-A of FIG. 6 showing a machinable casting area 12A based on the possible axial and radial offset of the larger diameter pin section 12 revealing a radial lightening opening 32.

Figure 8:
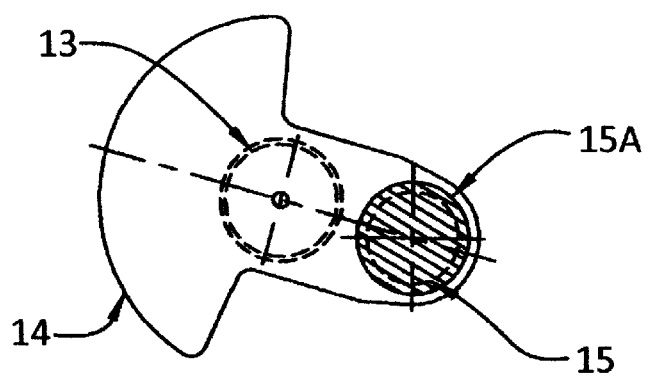
FIG. 8 is a cross sectional view of the as cast smaller diameter crank pin area taken along section B-B of FIG. 6.

FIG. 8 is a section view taken along lines B-B of FIG. 6 depicting an as cast crank pin area 15A of the crank shaft 13.

Figure 9:
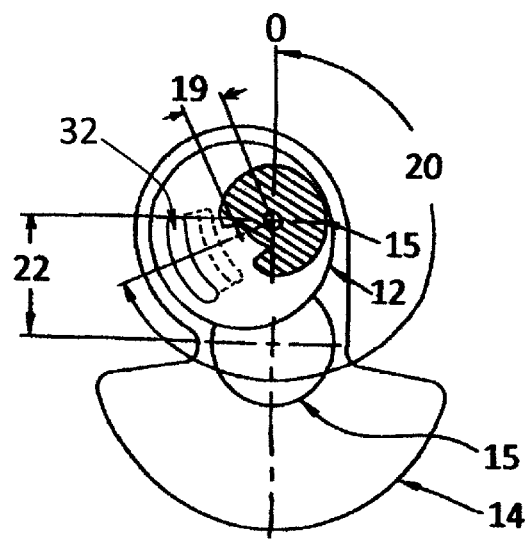
FIG. 9 depicts the cross sectional view taken along section C-C, of FIG. 6, machined smaller conventional pin are of the crank shaft in relationship with the larger offset pin area and crank shaft centerline and oil dispensing outlet, referenced for the Compression Ratio Comparison Table in FIG. 12.

FIG. 9 shows the cross sectional view taken along lines of section C-C of FIG. 6 depicting a machined/ground conventional crank pin section 15, of the casting area 15A supported by crank arms 14 of crank shaft 13. Offset position of the larger pin section 12 is denoted by 19 and pin to shaft centerline 22 referenced for the Compression Ratio Comparison Table 12.

Figure 10:
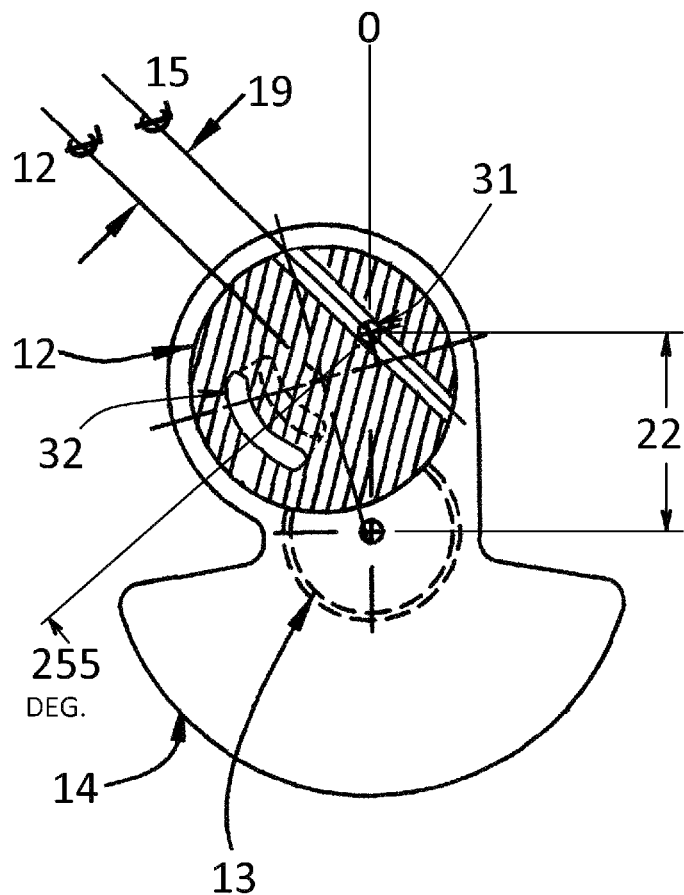
FIG. 10 presents the cross sectional view taken along section D-D of FIG. 6 machined larger diameter crank pin section offset axially and radially with a lightening opening and oil dispensing outlet, referenced for the Compression Ratio Comparison Table.

FIG. 10 Sec. D-D of FIG. 6 is a sectional view depicting the larger offset pin section after machining/grinding, with lightening opening 32 and oil dispensing hole 31, offset of centerlines 19 of pin section 12 from pin section 15 and pin to crank shaft 22, referenced for the Compression Ratio Comparison Table 12.

Figures 12, 13:
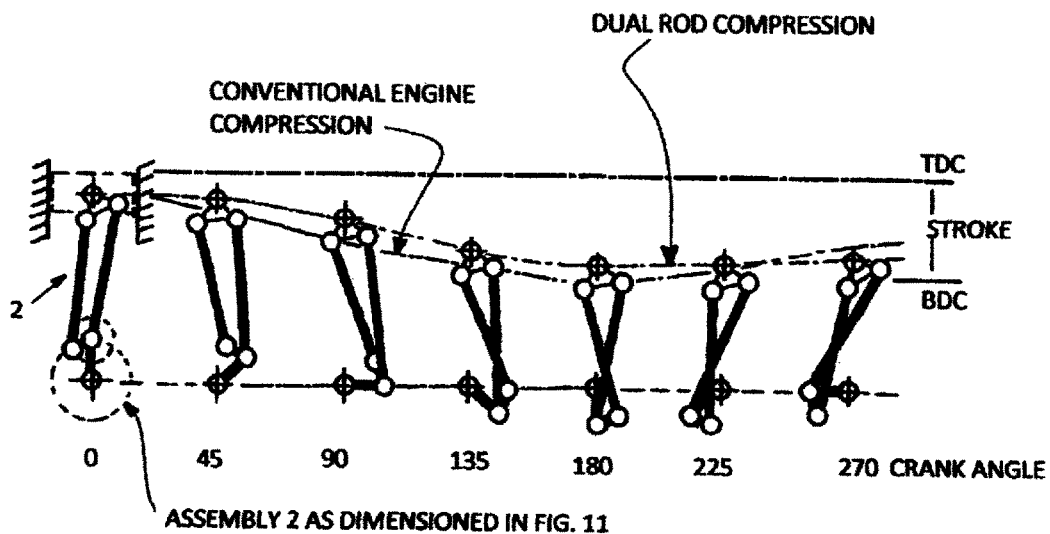
FIG. 12 TABLE 3 presents a Comparison Table of the invention as described and a conventional engine, to demonstrate in compression sample calculations the advantages of the invention.
FIG. 13 is a visual representation of the present invention of the Compression Ratio Comparison Table of FIG. 12, wherein the rotating crank shaft with dual rod assembly in motion, compared with a conventional engine of the same crank angles at the expansion cycle Assembly 2 of FIG. 2 shown in extended position while piston top at TDC with ITEMS of FIG. 11 calculated for a specific piston stroke. Crank shaft conventional smaller pin section at 12 o'clock/0 degree while offset crank pin section center 12 is shown in a selected radial lower position, extended away from conventional pin section 15 and compensated in length of piston rod 10 and 11 and the upper connecting pivot 16 geometry. The above described position of ITEMS of Table 2.

FIG. 11 TABLE 1 a list of items required to calculate compression in all of todays engines and referenced also for the Compression Ratio Comparison TABLE 3 of FIG. 12. TABLE 2 of FIG. 11, is a list of necessary items to calculate stroke of the invention because crank arm dimension 22 do not define stroke or TDC and BDC of the combustion engine of the present invention. Each change of component(s) dimensions has to be compensated by the other components, including the heights of piston rods to maintain stroke and piston top clearance. A list of ITEMS of TABLE 2 required to calculate stroke for the present invention, referenced also for the Compression Ratio Comparison TABLE 3 of FIG. 12.

FIG. 12 is the Compression Ratio Comparison Table to demonstrate the ability of the present invention by selecting the values of listed parameters to retard piston descent during the expansion cycle and maintain compression at selected crank angles in comparison of conventional engines.

FIG. 13 is a visual representation of the present inventions Dual Rod Assembly 2 of FIG. 2 in rotating motion between TDC and BDC, as dimensioned in TABLE 1 and 2 of FIG. 11, over the crank angles of the expansion cycle in comparison of an identically dimensioned conventional engine. Assembly 2 of FIG. 2 shown in extended position while piston top at TDC with ITEMS of FIG. 11 calculated for a specific piston stroke. Crank shaft 13 conventional smaller pin section 15 at 12 o'clock/0 degree while offset crank pin section 12 center is shown in a lower selected angular position, extended away from conventional pin section 15 and compensated by length of piston rod 11 and the upper connecting 16 geometry. The above described position of ITEMS of TABLE 2 can further extend piston bolt 14 position while crank shaft rotates forward clock wise thus lowering conventional pin section 15 position at the next crank angle shown, resulting in a slightly lower piston bolt 17 position of the Dual rod Assembly, as calculated. Further rotation of crank shaft 13 changes geometry of upper rod connector 16, defining the slower descent of the piston 18 in comparison of a conventional piston motion. The maximum extension of the Dual Rod Assembly 2 of FIG. 2 can be placed at the selected crank angle positions of the expansion cycle.

FIG. 14 demonstrates how the present day engine designs O and Y compare with the proposed invention X. A possible combination of Dual Fuel Injection and Dual Rod compression as represented by the Y/X plot.

FIG. 15 plan view with Sections A-A and B-B is a detachable two part axially offset, radially rotatable and a conventional crank pin adapter for modifying an existing crank pin. Adapter is a basically a split ring, comprised of a first section 34A and second section 34B. Adapter 34 defines a cylindrical outer bearing surface with the same lubrication amenities as the supporting crank pin. A cylindrical offset larger bearing surface is defined thru dimension 19. Adapter sections 34A, 34B mate along a plane, through the axis of cylindrical opening 15 representing the axis of the crank pin. Adapter sections 34A and 34B are held together by screws 25 that extends trough counterbored holes 33 in adapter section 34A and threaded holes 25A. Cylindrical opening 15 is dimensioned to be tightly fastened to the other cylindrical surface of the crank pin section 15, internal oil groves 33 collect lubrication from crank pin section 15 oil disposal holes to adapter bearing surface. As will be appreciated, adapter 34 can be disposed at any radial degree to define a specific relation to an associated connecting rod relative to the extending assembly, between BDC and TDC.

Having described the invention the following claimed:

1. A mechanical assembly for an internal combustion engine wherein a crankshaft is rotatable about a crankshaft axis and has a crank pin that orbits about said crankshaft axis, said crank pin having a first crank pin section with a first diameter and second crank pin section with a second diameter;
   wherein said first diameter is different from said second diameter;
   wherein said first crank pin section has a first axis that is offset from a second axis of said
   second crank pin section and a second end of a first connecting rod is connected to said first crank pin section and a second end of a second connecting rod is connected to said second crank pin section;
   wherein the first crank pin section with an offset centerline is radially variable around a centerline of a smaller diameter crank pin as cast and ground, also has a cast-in lightening opening space extending toward the centerline of the smaller diameter crank pin;
   wherein a larger cast crank pin section is replaceable by a detachable axially variable two-part pin section to mate along a plane through an axis of a concentric opening representing a diameter and an axis of the smaller diameter crank pin and held together by screws to present a bearing surface with oil disposable holes, connectable with internal grooves to pin section oil holes;
   wherein the first crank pin section includes a first split collar mountable on said crank pin that defines said first diameter of said first crank pin section, said first split collar has a hole there-through that is dimensioned to mount on a cylindrical portion of said crank pin, said first split collar is mountable in different positions on said cylindrical portion of said crank pin;
   wherein the two crank pin sections supporting the first connecting rod and the second connecting rod, share a load during four cycles, said larger diameter section is compensated in a bearing area for a shorter width for a higher share of a load during an expansion cycle; and
   wherein the first connecting rod and the second connecting rod with two different axial and radial shaft centers at a lower end are connected with a single variable position three-point rod end at an upper end, attached to the piston.

2. The mechanical assembly according to claim 1, further comprising a three point pivot device having has one upper and two lower position pivot pin locations for the first connecting rod and the second connecting rod, and simulating an attachment of the piston at the upper pivot pin location allowing variable rod positions if extension calculation would require, wherein an upper pivot is designated to mate with the piston while combining different forces of the first connecting rod and the second connecting rod.

3. The mechanical assembly according to claim 2, wherein the offset and radially variable centerline crank pin section adjacent to a conventional crank pin section, the first connecting rod and the second connecting rod and the upper rod end with the variable pivot points, together, can extend or shorten piston rod assembly length, as a dual piston rod assembly connected to said crank pin sections rotates around the crankshaft, during the expansion cycle; extensions of the dual piston rod assembly can be aligned with a selected/calculated crank angle of a combustion cycle, wherein top of the piston descends at a slower rate, reduces combustion space and retains a higher compression ratio at calculated positions relative to crank angles.

4. The mechanical assembly according to claim 3, wherein valves and ignition space of the dual piston rod assembly are combined with a dual fuel injection system for possible additional variable compression at more selected crank angle positions.

\* \* \* \* \*